United States Patent
Glogger et al.

(10) Patent No.: US 9,464,524 B2
(45) Date of Patent: Oct. 11, 2016

(54) ANCHOR ROD

(75) Inventors: Josef Glogger, Buchloe (DE); Bernhard Winkler, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 14/345,903

(22) PCT Filed: Jul. 10, 2012

(86) PCT No.: PCT/EP2012/063473
§ 371 (c)(1),
(2), (4) Date: Jul. 18, 2014

(87) PCT Pub. No.: WO2013/041259
PCT Pub. Date: Mar. 28, 2013

(65) Prior Publication Data
US 2014/0363239 A1    Dec. 11, 2014

(30) Foreign Application Priority Data
Sep. 21, 2011    (DE) .......................... 10 2011 083 153

(51) Int. Cl.
*E21D 20/02* (2006.01)
*F16B 13/14* (2006.01)

(52) U.S. Cl.
CPC ............. *E21D 20/02* (2013.01); *E21D 20/021* (2013.01); *E21D 20/025* (2013.01); *F16B 13/141* (2013.01)

(58) Field of Classification Search
CPC .... E21D 20/02; E21D 20/021; E21D 20/025
See application file for complete search history.

(56) References Cited

U.S. PATENT DOCUMENTS

| | | | | |
|---|---|---|---|---|
| 4,278,363 A | * | 7/1981 | Choi | 405/259.5 |
| 4,305,687 A | * | 12/1981 | Parker | 405/259.3 |
| 5,735,653 A | * | 4/1998 | Schiefer et al. | 411/82 |
| 6,029,417 A | * | 2/2000 | Leibhard et al. | 52/705 |
| 6,240,696 B1 | * | 6/2001 | Ludwig et al. | 52/698 |
| 6,514,013 B2 | * | 2/2003 | Li et al. | 405/259.5 |
| 7,802,951 B2 | * | 9/2010 | Houck et al. | 411/82 |

FOREIGN PATENT DOCUMENTS

DE    37 08 764 A1    9/1988
DE    20 2005 005 579 U1    9/2006
(Continued)

OTHER PUBLICATIONS

Litchi; DE 202009014039U1, Machine Translation; Sep. 2010.*
(Continued)

*Primary Examiner* — Benjamin Fiorello
(74) *Attorney, Agent, or Firm* — Crowell & Moring LLP

(57) ABSTRACT

An anchor rod is disclosed. The anchor rod includes an attachment region and an anchoring region which is insertable into a borehole and which has a profiled section. The profiled section interacts with a curable organic and/or inorganic mortar compound filled into the borehole. The profiled section includes a plurality of expansion sections disposed axially in a row which are conically shaped. For each of the plurality of expansion sections, a diameter of the expansion section increases in a direction toward a free front end of the anchor rod, a ratio of a distance of the expansion section to a mean borehole diameter is 0.40 to 0.60, a ratio of an outer diameter to a core diameter of the expansion section is 1.35 to 1.55, and a cone angle of the expansion section is 22.5° to 27.5°.

13 Claims, 1 Drawing Sheet

(56) References Cited

FOREIGN PATENT DOCUMENTS

| | | |
|---|---|---|
| DE | 10 2008 041 928 A1 | 3/2010 |
| DE | 20 2009 014 039 U1 | 10/2010 |
| DE | 10 2010 013 924 A1 | 11/2010 |
| EP | 0 348 545 A1 | 1/1990 |
| EP | 0 794 336 A1 | 9/1997 |
| EP | 0 856 669 A1 | 8/1998 |
| EP | 0 867 624 A1 | 9/1998 |
| EP | 1 213 492 A1 | 6/2002 |
| EP | 1 936 212 A2 | 6/2008 |
| JP | 10-227307 A | 8/1998 |
| JP | 10-299734 A | 11/1998 |
| JP | 2000-46029 A | 2/2000 |
| JP | 2001-342584 A | 12/2001 |
| JP | 2008-150940 A | 7/2008 |
| WO | WO 95/26457 A1 | 10/1995 |

OTHER PUBLICATIONS

German Search Report dated Sep. 18, 2012 (Six (6) pages).
PCT/EP2012/063473, PCT/IB/338 dated Apr. 3, 2014 (One (1) page).
PCT/EP2012/063473, International Preliminary Report on Patentability (PCT/IB/373) dated Mar. 25, 2014 (One (1) page).
PCT/EP2012/063473, Written Opinion of the International Searching Authority (PCT/ISA/237) dated Oct. 19, 2012 (Seven (7) pages).
International Search Report (PCT/ISA/210) dated Oct. 19, 2012 (Four (4) pages).
European Office Action issued in counterpart European Application No. 12 738 424.6-1760 dated Sep. 16, 2015 (Five (5) pages).
Japanese Notification of Reasons for Rejection issued in Japanese counterpart application No. 2014-531137 dated May 25, 2016, with English translation (Eight (8) pages).

* cited by examiner

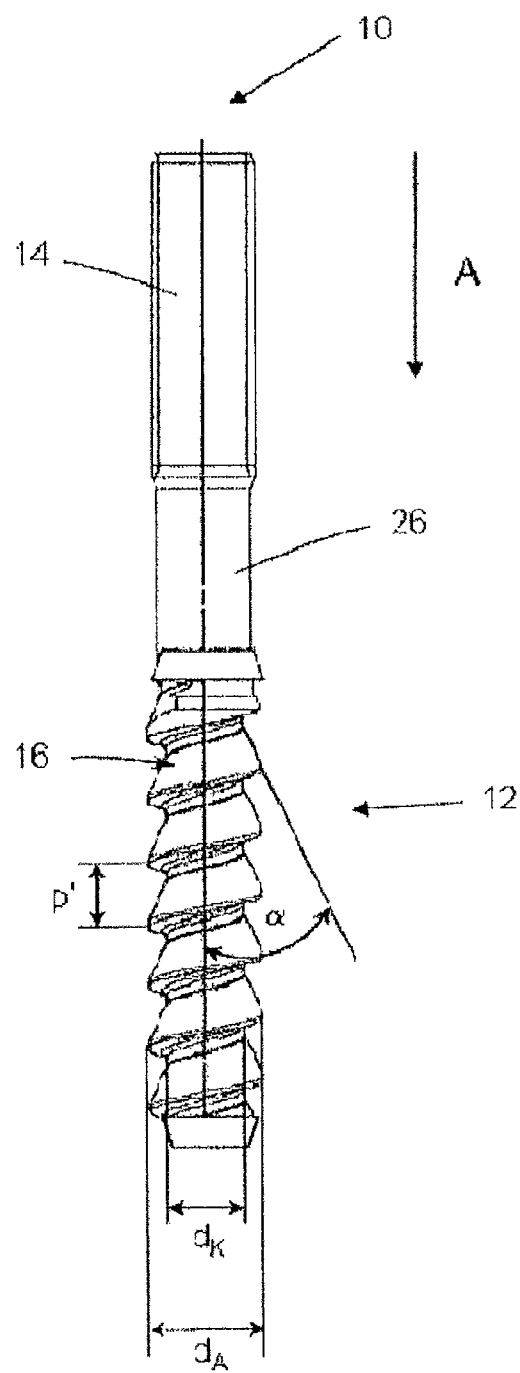

ANCHOR ROD

This application claims the priority of International Application No. PCT/EP2012/063473, filed Jul. 10, 2012, and German Patent Document No. 10 2011 083 153.3, filed Sep. 21, 2011, the disclosures of which are expressly incorporated by reference herein.

SUMMARY AND BACKGROUND OF THE INVENTION

The invention relates to an anchor rod for chemical fastening with organic and/or inorganic mortar compounds in a borehole, in particular for anchoring in uncleaned and/or cracked boreholes and in tensile zones of components.

In addition to conventional fastening techniques, wherein fastening points are prepared with the aid of expansion bolts or undercut systems anchored in a borehole in a force-fit and/or form-fit, chemical fastening techniques have been known from the prior art, wherein an anchor rod or another fastening element is inserted into a bore filled with a mortar compound and is fixed after the mortar compound has cured. The advantage of these types of composite anchoring systems is that, independent of the selected fastening element, they are largely free of expansion pressure and therefore permit low axial and edge spacing.

Anchor rods are known from the prior art that have a plurality of expansion segments as an anchoring region, which segments are formed from the shaft of the anchor rod, so-called composite expansion anchors. In the case of these anchor rods, the transmission of force takes place in the cured state of the mortar compound, on the one hand, through the bonding effect of the composite mortar between the borehole wall and the mortar compound and, on the other hand, via an expansion effect through the expansion segments. Due to the expansion effect, when the anchor rod is under stress, the normal forces (tensile forces) acting thereon are converted into radially acting expansion forces so that this fastening arrangement can subsequently expand and can therefore also be applied in the tensile zone of a component or in cracked concrete.

A disadvantage of the known composite expansion anchors is that they are only conditionally suitable for fastenings that are close to the edge, because of the expansion forces that are quite high to some extent.

Furthermore, for a secure anchoring of the fastening element, composite anchors require a time-consuming cleaning of the borehole prior to introducing the curable mortar compound, which, furthermore, leads to considerable contamination of the work environment with dust. If cleaning does not take place or it is only inadequate, this also has a negative impact on the load ratings. In the most unfavorable case, particularly when there is a lot of bore dust between the borehole wall and the cured mortar compound, the anchor rod can be pulled out of the borehole with the mortar shell when stress is applied.

Therefore, it is the object of the present invention to eliminate the cited disadvantages of the known anchor rods. An anchor rod is to be provided that makes a more uniform introduction of a load in the anchoring base possible so that a fastening close to the edge is also possible in cracked concrete and in uncleaned boreholes, and with which high load ratings can be achieved these being in a range above those of the prior art or at least in a comparable range.

The invention is based on the idea of creating an anchor rod with an optimized design of the anchoring region, which no longer requires the borehole to be cleaned in a time-consuming manner and which makes possible a fastening closer to the edge as compared to other expansion anchors or composite expansion anchors, without having to accept the load rating losses. Furthermore, an anchor rod is supposed to be created which can be used both in uncracked and cracked concrete and which provides similarly high load ratings.

The fact that a large outer diameter of the anchoring region and a small core diameter of the anchoring region produce high load ratings is known. However, both sizes can only be selected within specific limits. The outer diameter of the anchoring region is limited primarily by the borehole diameter. The outer diameter may be selected just large enough that the anchor rod can still be inserted into the borehole without any problems. However, it may also not be selected to be too small, because otherwise the mortar shell, which surrounds the anchor rod and fills the annular gap between the borehole wall and the anchor rod, will be too thick, making it impossible for the mortar shell to break open and, therefore, for expansion against the borehole wall to occur. The stress diameter in the anchoring region determines when material failure, i.e., a breakage of the anchor rod, occurs under the effect of normal forces. It must, therefore, be a specific minimum size depending upon the borehole size or nominal diameter of the anchor rod.

A further object was to design the anchoring region of an anchor rod of the type mentioned at the outset within the system-related framework conditions in such a way that the aforementioned disadvantages can be eliminated and the highest possible load ratings can be achieved also in an uncleaned and cracked borehole and with fastenings that are close to the edge.

The inventors have discovered that the ratio of the outer diameter to the core diameter of the conically shaped expansions and the ratio of the distance of the conically shaped expansions to the mean borehole diameter have an impact on the load ratings to be achieved, especially in uncleaned boreholes. In doing so, it was further discovered that excellent properties such as especially high load ratings, low expansion pressure, use in cleaned and/or uncleaned as well as in uncracked and/or cracked boreholes, can be achieved if the two ratios are in a specific range. If only one ratio is outside the range according to the invention, this has a considerable influence on the properties of the anchor rod. Furthermore, the inventors discovered that the two ratios are dependent on one another, because the geometries of the expansion sections overlap and mutually influence each other.

It is possible through the cone angle of the expansion sections, measured with respect to the anchor axis, to determine the proportion of normal forces, also referred to as tensile forces, which are converted into radial forces, also referred to as expansion forces, wherein a smaller cone angle produces a high proportion of radial forces. However, to enable use in the region of a component close to the edge, the radial forces may not be too large. To make it possible to apply the highest possible normal forces with the lowest possible expansion forces to a composite expansion anchor, the cone angle of the expansion sections may only be in a relatively narrow range.

To attain the object, according to the invention, an anchor rod is provided with an anchoring region, which has a profiled section, which is formed of a plurality of expansion sections disposed axially in a row, which are designed to be conically shaped and the diameter of each of which increases in the direction of the free front end of the anchor rod. The expansion sections are characterized in that the ratio of the distance (p) of the expansion sections to the mean borehole diameter ($d_{cut,\ med}$) is 0.40 to 0.60, the ratio of the outer diameter ($d_A$) to the core diameter ($d_K$) of the expansion sections is 1.35 to 1.55 and the cone angle of the expansion sections ($\alpha$) is 22.5° to 27.5°. The mean borehole diameter $d_{cut,\ med}$ corresponds, in this case, to half the sum of the maximum and minimum borehole diameters according to ICBO and ETAG Guidelines for the metric system or ACI Guideline 355.2.07 for the Anglo-American system with a given diameter for the anchor rod:

$$d_{cut,\ med} = (d_{cut,\ min} + d_{cut,\ max})/2$$

The ratio of the distance of the expansion sections (p) to the mean borehole diameter ($d_{cut,\ med}$) is preferably 0.40 to 0.55. The ratio of the outer diameter of the expansion sections ($d_A$) to the core diameter ($d_K$) of the anchor rod is preferably 1.40 to 1.55 and the cone angle of the expansion sections ($\alpha$) is preferably 25°. The distance (p) and the cone geometry of the expansion sections are constant over the anchoring region.

This results in the following ranges for the conically shaped expansion sections:

| Ratio p to $d_{cut,\ med}$ | Ratio $d_A$ to $d_K$ | Cone Angle |
|---|---|---|
| 0.40-0.60 | 1.35-1.55 | 25 ± 2.5° |
| 0.40-0.55 | 1.40-1.50 | 25 ± 2.5° |

Because the mean borehole diameter $d_{cut,\ med}$ with a given borehole diameter is almost constant, this ratio can be controlled substantially over the distance of the expansion sections p.

In the case of a ratio p to $d_{cut,\ med}$ that is greater than 0.60, the load rating decreases, because the distance of the expansion sections gets too large and, consequently, fewer expansion sections can be accommodated in the anchoring region. If the ratio is less than 0.40, even though higher load ratings can theoretically be achieved, geometrically this involves either a larger core diameter $d_K$ or a smaller outer diameter $d_A$ of the expansion section, thus resulting in a negative impact on the ratio $d_A$ to $d_K$.

In the case of a ratio $d_A$ to $d_K$ that is greater than 1.55, theoretically higher load ratings can also be achieved here, however to the detriment of the stress cross section of the anchoring region, which should have a minimum so that the anchor rod material does not fail. This means that the core diameter $d_K$ with a given outer diameter $d_A$, which is limited by the borehole size, cannot be made arbitrarily small without jeopardizing the load bearing capacity of the anchor rod. In the case of a ratio $d_A$ to $d_K$ that is less than 1.35, the possible load ratings drop.

The cone angle has a direct impact on the load rating and the expansion effect of the anchor rod. If the cone angle is less than 22.5°, the load ratings namely increase further. However, the expansion effect also increases as a result of this, i.e., high normal forces are also converted into high radial forces (expansion forces), which limits the use of the anchor rod for fastenings that are close to the edge. With a cone angle greater than 27.5°, the expansion effect drops, thereby increasing the probability that the anchor rod will no longer detach from the mortar and the mortar shell will no longer break open. Because of this, the mortar shell can no longer expand and the anchor detaches along with the mortar shell from the borehole wall and can be pulled out of the borehole.

The means for load application to the attachment region is expediently a thread, in particular a standard thread, for fixing an attachment part in position.

Essential for use in uncleaned and/or cracked boreholes is not a bonded connection but a form-fitting connection between the composite expansion anchor and the mortar compound. For the composite expansion anchor to be able to facilitate high load ratings and a subsequent expansion in uncleaned and/or cracked boreholes, it is necessary for the mortar shell, which encases the expansion segments, to break open. This is only possible if the mortar shell does not adhere to the expansion segments of the anchor rod with a bonded or frictional connection.

Therefore, it has proven to be advantageous for the anchoring region to have a non-adhesive surface with respect to the curable mortar compound. For this purpose, the anchoring region is preferably provided with a casing or a coating, which is non-adhesive with respect to the mortar compound. As a result, the anchor rod is able to detach from the cured mortar shell with a tensile load in an opening crack and execute a movement in the axial direction. During displacement, the conically shaped expansion sections slide into the region between the mortar shell and the anchoring region that is expanded from the crack in the direction of the tensile force so that a form-fitting tension again develops between the anchor rod and the mortar shell. By further increasing the tensile load, radial forces build up with the aid of the surfaces of the conically shaped expansion sections and the cured mortar shell is broken. This leads to the anchor rod being able to expand with respect to the borehole wall, and the form fit between the borehole wall and the mortar shells is reestablished. Therefore, despite a dust layer between the mortar shell and the borehole wall, the anchor rod is able to initiate forces in the component. Because of this ability to subsequently expand, the anchor rod is suitable for use in cracks and in the tensile zone of the concrete. Due to the subsequent expansion behavior, the anchor rod according to the invention can also be used in boreholes that are poorly cleaned or not cleaned at all.

The surface of the coarse screw thread can be bright-nickel-plated and/or chromium-plated or be coated with other release agents and/or lubricants, such as a wax-like, synthetic polymer, polytetrafluoroethylene, silicone polymer and the like, for instance. Alternatively, it is also possible to electrochemically polish the surface, for example by means of electro-polishing.

To ensure the flow of mortar from the base of the borehole to the opening of the borehole and to avoid air inclusions when placing the anchor rod, the conically shaped expansion sections should be provided, especially in the case of a small annular gap, with means for the passage of the organic and/or inorganic mortar compound such as flow channels, for instance. The flow channels of the conically shaped expansion sections are preferably disposed offset from one another, wherein especially preferably the flow channels are disposed helically around the anchoring region of the anchor rod. This ensures the most uniform and complete wetting possible of the surfaces of the conically shaped expansion sections. Any air that is possibly enclosed between the conically shaped expansion sections when the anchor rod is being positioned is pressed upward through the flow channels to the borehole opening. The flow channels must be dimensioned such that the organic and/or inorganic mortar compound is able to flow through them without great resistance. This also reduces the resistance when inserting the anchor rod. As a result, the most complete wetting possible of the anchoring region with the curable mortar compound is achieved.

BRIEF DESCRIPTION OF THE DRAWING

FIG. 1 illustrates an embodiment of an anchor rod according to the invention.

DETAILED DESCRIPTION OF THE DRAWING

In an especially preferred embodiment of the anchor rod according to the invention, the conically shaped expansion sections are connected to each other and run helically along the anchoring region so that a thread-like profiled section that corresponds to a coarse screw thread is obtained as depicted in FIG. 1. Because of this, it is not necessary for the profiled section to be provided with means for the passage of the organic and/or inorganic mortar compound. Therefore, the conical surface is completely available for introducing the load into the component, which produces higher load ratings.

In this embodiment, the distances (p) of the conically shaped expansion sections correspond to the pitch (p') of the thread, which is constant over the longitudinal extension of the anchoring region. As a result, a uniform conveyance of the curable organic and/or inorganic mortar compound and, therefore, a complete wetting of the anchor rod are ensured over the entire anchoring region.

The placement process of the anchor rod is accomplished in a known manner.

The stress cross section of the conically shaped expansion sections preferably corresponds to at least the stress cross section of the other anchoring elements, such as the cylindrical shaft or connecting thread on the attachment region so that premature steel failure of the anchor rod can be prevented. Because of the advantageous subsequent expansion behavior of the anchor rod under stress, the anchor rod according to the invention can be disposed in a tensile zone of a component or in a cracked borehole. Furthermore, time-consuming cleaning of the borehole prior to placement of the anchor rod is no longer required. Due to the optimized geometry of the anchoring region, more precisely the profiled section of the anchoring region, high load ratings of the integrated anchor rod are also achieved in the region of a component close to the edge.

Eliminating the required cleaning steps (e.g., blowing out, brushing out and blowing out the borehole again) increases application safety, and placement of the anchor rod is considerably accelerated. No additional cleaning equipment is needed to place the anchor rod, and the ambient air and therefore the user are no longer additionally subjected to blown-out bore dust or dust from cleaning.

Hereinafter, the invention will be explained in greater detail making reference to an exemplary embodiment depicted in the schematic drawing. The sole FIGURE shows an anchor rod 10, which has an anchoring region 12 along with an attachment region 14. The anchoring region 12 is provided with a profiled section 16 and is intended to be inserted into a prefabricated borehole in insertion direction A.

Before the anchor rod 10 is inserted, the borehole is filled with a curable organic and/or inorganic mortar compound, thereby producing a form-fitting connection of the anchoring region 12 to the curable mortar compound. The borehole here has a diameter ($d_{cut}$, not shown in the drawing), which is selected greater than the maximum diameter of the anchoring region 12 ($d_A$) such that it is surrounded on all sides by the curable mortar compound. The maximum outer diameter $d_A$ of the conically shaped expansion sections is selected to be approximately 0.2 mm smaller than the borehole diameter.

The stress cross section of the conically shaped expansion section 16 $d_K$ corresponds approximately to the stress cross section of the anchor rod 10.

The profiled section runs at least over the entire region of the anchor rod 10, which forms the anchoring region 12 in an embedded state. However, it is also possible for the cylindrical shaft and to some extent the connecting thread to be embedded in the borehole. The profiled section indicates the minimum embedding depth for the anchor rod 10. As the FIGURE clearly shows, the profiled section 16 has the shape of conical expansion sections, which are disposed thread-like around the anchor rod so that a type of coarse screw thread is produced. In the process, the conical surface points away from the anchor rod in insertion direction A and describes a cone angle α with respect to the longitudinal axis of the anchor rod 10 with the longitudinal direction.

In the example shown, the attachment region 14 is designed such that a region 26 with a slightly reduced diameter is provided between the free end of the attachment region 14 and the beginning of the anchoring region 12, and that this region can be used to fix another attachment part in position or apply an inscription to the anchor rod. However, the region 26 can also have the same diameter as the attachment section 14 or, if the attachment section 14 is provided with a thread, it can likewise be threaded.

To create a fastening arrangement, a borehole with the required depth and the required diameter is first made. Subsequently, the borehole is filled with an appropriate amount of the curable organic and/or inorganic mortar compound and then the anchor rod is introduced into the borehole, with the anchoring region 12 forward. The helical embodiment of the conically shaped expansion sections 16 is responsible for ensuring an optimum flow of the mortar compound in the direction of the mouth of the borehole. After the mortar compound has cured, the anchor rod can be stressed up to the maximum load level.

For the preferred embodiments shown in FIG. 1 of an anchor rod according to the invention for conventional anchor rod types, the following tables (Table 1: Metric system [mm]; Table 2: Anglo-American system [inches]) provide the common internationally standardized bore nominal diameter ($d_{cut, nom}$), the minimum borehole diameter ($d_{cut, min}$) and the maximum borehole diameter ($d_{cut, max}$) according to ICBO and ETAG Guidelines for the metric system or ACI Guideline 355.2.07 for the Anglo-American system along with the mean values ($d_{cut, med}$) thereof, the pitch (p) of the conically shaped expansion section, the cone angle (α), the associated outer diameter of the conically shaped expansion section ($d_A$), the core diameter of the conically shaped expansion sections ($d_K$), the ratio of the pitch (p) to the mean borehole diameter ($d_{cut, med}$) and the ratio of the outer diameter ($d_A$) to the core diameter ($d_K$) of the conically shaped expansion sections.

TABLE 1

Preferred values in mm for standardized anchor rods according to the preferred embodiment shown in the figure

| | $d_{cut,nom}$[1] [mm] | $d_{cut,min}$[2] [mm] | $d_{cut,max}$[3] [mm] | $d_{cut,med}$[4] [mm] | p[5] [mm] | α[6] [mm] | $d_A$[7] [mm] | $d_K$[8] [mm] | $p/d_{cut,med}$[3] [mm] | $d_A/d_K$ |
|---|---|---|---|---|---|---|---|---|---|---|
| M8 | 10.0 | 10.05 | 10.45 | 10.25 | 5.25 | 25.0 | 9.25 | 6.30 | 0.51 | 1.47 |
| M10 | 12.0 | 12.10 | 12.50 | 12.30 | 6.40 | 25.0 | 11.25 | 7.60 | 0.52 | 1.48 |
| M12 | 14.0 | 14.10 | 14.50 | 14.30 | 7.50 | 25.0 | 13.25 | 9.00 | 0.52 | 1.47 |

TABLE 1-continued

Preferred values in mm for standardized anchor rods according to the preferred embodiment shown in the figure

| | $d_{cut,nom}$[1] [mm] | $d_{cut,min}$[2] [mm] | $d_{cut,max}$[3] [mm] | $d_{cut,med}$[4] [mm] | p[5] [mm] | α[6] [mm] | $d_A$[7] [mm] | $d_K$[8] [mm] | $p/d_{cut,med}$[3] [mm] | $d_A/d_K$ |
|---|---|---|---|---|---|---|---|---|---|---|
| M16 | 18.0 | 18.10 | 18.50 | 18.30 | 9.00 | 25.0 | 17.25 | 12.00 | 0.49 | 1.44 |
| M20 | 22.0 | 22.10 | 22.55 | 22.33 | 9.75 | 25.0 | 21.05 | 15.00 | 0.44 | 1.40 |

[1]Nominal bore diameter
[2]Minimum bore diameter according to ICBO and ETAG Guidelines
[3]Maximum bore diameter according to ICBO and ETAG Guidelines
[4]Mean bore diameter ($d_{cut,med} = (d_{cut,min}) + (d_{cut,max})/2$)
[5]Thread pitch
[6]Cone angle
[7]Outer diameter, conically shaped expansion sections
[8]Core diameter, conically shaped expansion sections

TABLE 2

Preferred values in inches for standardized anchor rods according to the preferred embodiment shown in the figure

| | $d_{cut,nom}$[1] [mm] | $d_{cut,min}$[2] [mm] | $d_{cut,max}$[3] [mm] | $d_{cut,med}$[4] [mm] | p[5] [mm] | α[6] [mm] | $d_A$[7] [mm] | $d_K$[8] [mm] | $p/d_{cut,med}$[3] [mm] | $d_A/d_K$ |
|---|---|---|---|---|---|---|---|---|---|---|
| ³⁄₈" | 11.11 (⁷⁄₁₆") | 11.37 | 11.87 | 11.62 | 5.90 | 25.0 | 10.40 | 7.00 | 0.51 | 1.49 |
| ½" | 14.29 (⁹⁄₁₆") | 14.54 | 15.05 | 14.80 | 7.50 | 25.0 | 13.50 | 9.10 | 0.51 | 1.48 |
| ⁵⁄₈" | 19.05 (¾") | 19.41 | 19.94 | 19.68 | 9.30 | 25.0 | 18.40 | 12.20 | 0.47 | 1.51 |
| ¾" | 22.23 (⅞") | 22.66 | 23.29 | 22.98 | 9.75 | 25.0 | 21.25 | 15.10 | 0.42 | 1.41 |

[1]Nominal bore diameter
[2]Minimum bore diameter according to ACI Guideline 355.2.07
[3]Maximum bore diameter according to ACI Guideline 355.2.07
[4]Mean bore diameter ($d_{cut,med} = (d_{cut,min}) + (d_{cut,max})/2$)
[5]Thread pitch
[6]Cone angle
[7]Outer diameter, conically shaped expansion sections
[8]Core diameter, conically shaped expansion sections

The invention claimed is:

1. A method for fastening an anchor rod in an unclean borehole, comprising the steps of:
   making the borehole;
   filling the borehole with a curable organic and/or inorganic mortar compound without cleaning the borehole;
   disposing the anchor rod in the borehole after the filling step; and
   curing the organic and/or inorganic mortar compound such that the anchor rod is fastened close to an edge of the borehole;
   wherein the anchor rod includes:
      an attachment region; and
      an anchoring region which has a profiled section, wherein the profiled section interacts with the curable organic and/or inorganic mortar compound filled into the borehole;
   wherein the profiled section includes a plurality of expansion sections disposed axially in a row which are conically shaped;
   wherein for each of the plurality of expansion sections:
      a diameter of the expansion section increases in a direction toward a free front end of the anchor rod;
      a ratio of a distance of the expansion section to a mean borehole diameter is 0.40 to 0.60;
      a ratio of an outer diameter to a core diameter of the expansion section is 1.35 to 1.55; and
      a cone angle of the expansion section is 22.5° to 27.5°.

2. The method according to claim 1, wherein for each of the plurality of expansion sections:
   the ratio of the distance of the expansion section to the mean borehole diameter is 0.40 to 0.55;
   the ratio of the outer diameter to the core diameter of the expansion section is 1.40 to 1.55; and
   the cone angle of the expansion section is 25°.

3. The method according to claim 1, wherein the distance of the expansion section for each of the plurality of the expansion sections is substantially constant over a longitudinal extension of the anchoring region.

4. The method according to claim 1, wherein a surface of each of the plurality of expansion sections has a non-adhesive property with respect to the organic and/or inorganic mortar compound.

5. The method according to claim 1, wherein a surface of each of the plurality of expansion sections includes a coating.

6. The method according to claim 1, wherein a surface of each of the plurality of expansion sections is bright-nickel-plated and/or chromium-plated.

7. The method according to claim 1, wherein a surface of each of the plurality of expansion sections is electrochemically polished.

8. The method according to claim 1, wherein a surface of each of the plurality of expansion sections is electro-polished.

9. The method according to claim 1, wherein each of the plurality of expansion sections includes a passage for the organic and/or inorganic mortar compound.

10. The method according to claim 9, wherein the passage is a flow channel.

11. The method according to claim 1, wherein each of the plurality of expansion sections run helically along the anchoring region.

12. The method according to claim 1, wherein the unclean borehole is in cracked concrete.

13. The method according to claim 1, wherein the unclean borehole is in uncracked concrete.

\* \* \* \* \*